(12) United States Patent
Matolin et al.

(10) Patent No.: US 11,184,572 B2
(45) Date of Patent: Nov. 23, 2021

(54) EVENT ARRAY READOUT CONTROL OF EVENT-BASED VISION SENSING

(71) Applicant: PROPHESEE, Paris (FR)

(72) Inventors: Daniel Matolin, Freital (DE); Thomas Finateu, Veneux les Sablons (FR); Massimiliano Giulioni, Barcelona (ES); Christoph Posch, Bad Fischau-Brunn (AT)

(73) Assignee: PROPHESSE, Paris (FR)

( * ) Notice: Subject to any disclaimer, the term of this patent is extended or adjusted under 35 U.S.C. 154(b) by 0 days.

(21) Appl. No.: 17/174,499

(22) Filed: Feb. 12, 2021

(65) Prior Publication Data

US 2021/0258525 A1    Aug. 19, 2021

Related U.S. Application Data

(60) Provisional application No. 62/976,868, filed on Feb. 14, 2020.

(51) Int. Cl.
*H04N 5/378* (2011.01)
*H04N 5/345* (2011.01)
*H04N 5/341* (2011.01)

(52) U.S. Cl.
CPC .............. *H04N 5/378* (2013.01); *H04N 5/341* (2013.01); *H04N 5/3454* (2013.01)

(58) Field of Classification Search
CPC .... H04N 5/341; H04N 5/3454; H04N 5/3456; H04N 5/37452; H04N 5/378
See application file for complete search history.

(56) References Cited

U.S. PATENT DOCUMENTS 6,037,748 A    3/2000  Yee et al.
7,728,269 B2    6/2010  Lichtsteiner et al.
(Continued)

FOREIGN PATENT DOCUMENTS

EP           2512125 B1    7/2018
WO    WO 2019/115517 A1    6/2019

OTHER PUBLICATIONS

Patrick Lichsteiner, et al., "A 128×128 dB 15 us Latency Asynchronous Temporal Contrast Vision Sensor", IEEE Journal of Solid-State Circuits, vol. 43, No. 2, Feb. 2008. (11 pgs).
(Continued)

*Primary Examiner* — Lin Ye
*Assistant Examiner* — Chriss S Yoder, III
(74) *Attorney, Agent, or Firm* — Finnegan, Henderson, Farabow, Garrett & Dunner LLP

(57) ABSTRACT

A circuit includes a selection circuit electrically coupled to pixels of a line of an event vision sensor. The selection circuit is configured to receive an activation signal from an active pixel of the line, generate an acknowledge signal in response to receiving the activation signal, and send the acknowledge signal to the pixels of the line. The circuit also includes a control circuit that is electrically coupled to a pixel having a largest distance to the selection circuit among the pixels of the line. The control circuit is configured to receive the acknowledge signal from the selection circuit, and generate a process-reading signal in response to receiving the acknowledge signal. The circuit also includes an interface circuit electrically coupled to the pixels of the line and configured to cause a reset of the selection circuit, the control circuit, and the pixels of the line after receiving the process-reading signal.

29 Claims, 9 Drawing Sheets

(56) References Cited

U.S. PATENT DOCUMENTS

| | | | | |
|---|---|---|---|---|
| 9,521,337 B1* | 12/2016 | Shen | ................... | H04N 5/3355 |
| 9,986,179 B2* | 5/2018 | Govil | ................... | H04N 5/345 |
| 2010/0182468 A1* | 7/2010 | Posch | ................... | H04N 5/335 |
| | | | | 348/294 |
| 2012/0261553 A1* | 10/2012 | Elkind | ................... | H04N 5/335 |
| | | | | 250/208.1 |
| 2014/0175264 A1* | 6/2014 | Xue | ................... | H04N 5/37457 |
| | | | | 250/208.1 |
| 2016/0057366 A1 | 2/2016 | Lee et al. | | |

OTHER PUBLICATIONS

Notification of Transmittal and the International Search Report and the Written Opinion of the International Searching Authority for PCT/EP2021/053551, dated Jul. 27, 2021 (24 pgs).

Kwabena A. Boahen, "Point-to-Point Connectivity Between Neuromorphic Chips Using Address Events", IEEE Transactions on Circuits and Systems-II: Analog and Digital Signal Processing, vol. 47, No. 5, May 2000, pp. 416-434.

Kwabena A. Boahen, "A Burst-Mode Word-Serial Address-Event Link-I: Transmitter Design", IEEE Transactions on Circuits and Systems-I: Regular Papers, vol. 51, No. 7, Jul. 2004, pp. 1269-1280.

Thomas Finateu et al., "A 1280×720 Black-Illuminated Stacked Temporal Contrast Event-Based Vision Sensor with 4.86 μm Pixels, 1.066GEPS Readout, Programmable Event-Rate Controller and Compressive Data-Formatting Pipeline", 2020 IEEE International Solid-State Circuits Conference, Digest of Technical Papers, Feb. 17, 2020, pp. 112-113.

Jörg Kramer, "An Integrated Optical Transient Sensor", IEEE Transactions on Circuits and Systems-II: Analog and Digital Signal Processing, vol. 49, No. 9, Sep. 2002, pp. 612-628.

Oliver Landolt et al., "Visual Sensor with Resolution Enhancement by Mechanical Vibrations", Proceedings 2001 Conference on Advanced Research in VLSI, Mar. 2001, pp. 249-264.

Juan A. Leñero-Bardallo et al., "A 3.6 μS Latency Asynchronous Frame-Free Event-Driven Dynamic-Vision-Sensor", IEEE Journal of Solid-State Circuits, vol. 46, No. 6, Jun. 2011, pp. 1443-1455.

Chenghan Li et al., "A 132 by 104 10 μm-Pixel 250 μW 1kefps Dynamic Vision Sensor with Pixel-Parallel Noise and Spatial Redundancy Suppression", 2019 Symposium on VLSI Circuits Digest of Technical Papers.

Patrick Lichtsteiner, et al., "A 128×128 120 dB 30mw Asynchronous Vision Sensor That Responds To Relative Intensity Change", 2006 IEEE International Solid-State Circuits Conference, Digest of Technical Papers, Feb. 2006, pp. 2060-2069.

Patrick Lichtsteiner, et al., "A 128×128 120 dB 15 μs Latency Asynchronous Temporal Contrast Vision Sensor", IEEE Journal of Solid-State Circuits, vol. 43, No. 2, Feb. 2008, pp. 566-576.

Bongki Son et al., "A 640×480 Dynamic Vision Sensor with a 9 μm Pixel and 300Meps Address-Event Representation", 2017 IEEE International Solid-State Circuits Conference, Digest of Technical Papers, Feb. 2017, pp. 66-67.

Partial International Search and Provisional Opinion, International Application No. PCT/EP2021/053551 for Prophesee, dated Apr. 30, 2021 (17 pages).

Boahen, Kwabena A. "Point-to-point connectivity between neuromorphic chips using address events." *IEEE Transactions on Circuits and Systems II: Analog and Digital Signal Processing* 47.5 (2000): 416-434.

Boahen, Kwabena A. "A burst-mode word-serial address-event link-I: Transmitter design." *IEEE Transactions on Circuits and Systems I: Regular Papers* 51.7 (2004): 1269-1280.

T. Finateu et al., "5.10 A 1280×720 Back-Illuminated Stacked Temporal Contrast Event-Based Vision Sensor with 4.86 μm Pixels, 1.066GEPS Readout, Programmable Event-Rate Controller and Compressive Data-Formatting Pipeline," *2020 IEEE International Solid-State Circuits Conference—(ISSCC)*, San Francisco, CA, USA, 2020, pp. 112-114.

Kramer, Jörg. "An integrated optical transient sensor." *IEEE Transactions on Circuits and Systems II: Analog and Digital Signal Processing* 49.9 (2002): 612-628.

Landolt, Oliver, Ania Mitros, and Christof Koch. "Visual sensor with resolution enhancement by mechanical vibrations." *Proceedings 2001 Conference on Advanced Research in VLSI. ARVLSI 2001*. IEEE, 2001.

Leñero-Bardallo, Juan Antonio, Teresa Serrano-Gotarredona, and Bernabé Linares-Barranco. "A 3.6 μs Latency Asynchronous Frame-Free Event-Driven Dynamic-Vision-Sensor." *IEEE Journal of Solid-State Circuits* 46.6 (2011): 1443-1455.

Li, Chenghan, et al. "A 132 by 104 10 μm-Pixel 250 μW 1 kefps Dynamic Vision Sensor with Pixel-Parallel Noise and Spatial Redundancy Suppression." *2019 Symposium on VLSI Circuits*. IEEE, 2019.

Lichtsteiner, Patrick, Christoph Posch, and Tobi Delbruck. "A 128×128 120db 30mw asynchronous vision sensor that responds to relative intensity change." *2006 IEEE International Solid State Circuits Conference-Digest of Technical Papers*. IEEE, 2006.

Patrick, Lichtsteiner, Christoph Posch, and Tobi Delbruck. "A 128×128 120 dB 15μ s Latency Asynchronous Temporal Contrast Vision Sensor." *IEEE journal of solid-state circuits* 43 (2008): 566-576.

B. Son et al., "4.1 A 640×480 dynamic vision sensor with a 9 μm pixel and 300Meps address-event representation," *2017 IEEE International Solid-State Circuits Conference (ISSCC)*, San Francisco, CA, 2017, pp. 66-67.

* cited by examiner

EVENT ARRAY READOUT CONTROL OF EVENT-BASED VISION SENSING

CROSS-REFERENCE TO RELATED APPLICATION(S)

This application claims priority to U.S. Provisional Patent Application No. 62/976,868, filed on Feb. 14, 2020, the contents of which is incorporated by reference herein in its entirety.

TECHNICAL FIELD

The present disclosure relates generally to the field of event-based vision sensing and systems and methods for processing events. More specifically, and without limitation, this disclosure relates to event array readout control for event-based image sensing. The sensors and techniques disclosed herein may be used in various applications and vision systems, such as security systems, autonomous vehicles, and other systems that benefit from rapid and efficient motion or event detection.

BACKGROUND

Extant image sensors use a plurality of pixels comprising semiconductor charge-coupled devices (CCD), complementary metal-oxide-semiconductor (CMOS) sensors, N-type metal-oxide-semiconductor (NMOS) sensors, or other sensors in order to capture digital images of scenes. However, conventional image sensors are slow at detecting rapid motion because each frame is captured as a full image of the scene. Moreover, such image sensors produce large amounts of data, exponentially increasing the amount of post-processing required to sift out, for example, motion information from the captured images.

Many existing technologies do not require the vast detail provided by image sensors that capture full images. For example, security systems or other similar systems may only be interested in motion data and not in portions of the image having no motion. In another example, autonomous vehicles must process captured data quickly and efficiently in order to make decisions comparable with human perception time (generally on the order of 1 second or less). Such efficiency is capped when large amounts of data must be discarded (e.g., via post-processing) in order to obtain the portion of captured data relevant to the situation.

SUMMARY

Embodiments of this disclosure provide a circuit for sampling data from pixels of an event vision sensor. The circuit may include a selection circuit, a control circuit, and an interface circuit. The selection circuit may be electrically coupled to pixels of a line of the event vision sensor. The selection circuit may be configured to: receive an activation signal from an active pixel of the line, generate an acknowledge signal in response to receiving the activation signal, and send the acknowledge signal to the pixels of the line, wherein each pixel of the line is configured to generate a request-reading signal when that pixel is active when receiving the acknowledge signal. The control circuit may be electrically coupled to a pixel having a largest distance to the selection circuit among the pixels of the line. The control circuit may be configured to: receive the acknowledge signal from the selection circuit, and generate a process-reading signal in response to receiving the acknowledge signal. The interface circuit may be electrically coupled to the pixels of the line and configured to cause to reset the selection circuit, the control circuit, and the pixels of the line after receiving the process-reading signal.

Embodiments of this disclosure also provide a circuit for sampling data from pixels of an event vision sensor. The circuit may include a line selection circuit, an interface circuit, and a timer circuit. The line selection circuit may be electrically coupled to pixels of a line of the event vision sensor. The line selection circuit may be configured to: receive an activation signal from an active pixel of the line, generate an acknowledge signal and a starting signal in response to receiving the activation signal, and send the acknowledge signal to the pixels of the line, wherein each pixel of the line is configured to generate a request-reading signal when the pixel is active when receiving the acknowledge signal. The interface circuit may be electrically coupled to the pixels of the line. The interface circuit may be configured to receive a data signal from the pixel having generated the request-reading signal in response to receiving the request-reading signal. The timer circuit may be electrically coupled to the interface circuit and the line selection circuit. The timer circuit may be configured to: receive the starting signal from the line selection circuit, and cause to reset the line selection circuit and the pixels of the line if no data signal is received by the interface circuit after a time interval from a timestamp of receiving the starting signal exceeds a threshold time.

Embodiments of this disclosure further provide a pixel circuit for use in an image sensor. The pixel circuit may include a comparator and a first latch circuit. The comparator may be configured to generate a first request-reading signal when an input signal of the comparator matches a first condition, the input signal being generated from a photosensitive element in response to brightness of light impinging on the photosensitive element. The first latch circuit may include a first set input, a first reset input, and a first output, wherein the first reset input and the first output are electrically coupled to an interface circuit, and the first set input is electrically coupled to the comparator. The first latch circuit may be configured to: receive the first request-reading signal by the first set input from the comparator, output the first request-reading signal to the interface circuit, lock the first set input to receive no signal, and reset the first set input to receive a new signal in response to receiving an acknowledge signal from the interface circuit by the first reset input.

BRIEF DESCRIPTION OF THE DRAWINGS

The accompanying drawings, which comprise a part of this specification, illustrate several embodiments and, together with the description, serve to explain the principles and features of the disclosed embodiments. In the drawings.

DETAILED DESCRIPTION

Figure 1:
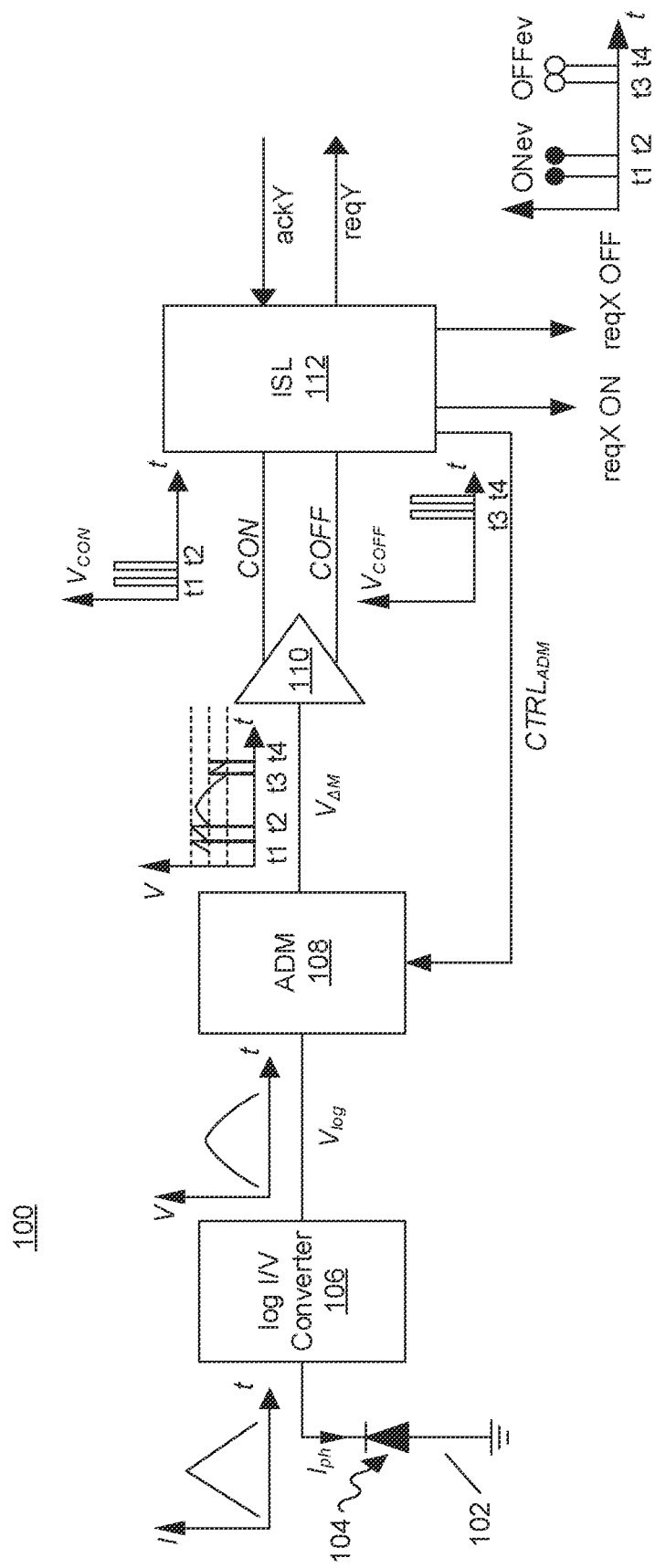
FIG. 1 is a schematic representation of exemplary architecture of a pixel of an event-based vision sensor, according to embodiments of the present disclosure.

The embodiments disclosed herein relate to systems and methods for vision sensing, including asynchronous, time-based sensing. The disclosed embodiments also relate to event array readout architecture and control for event-based vision sensing. Advantageously, the exemplary embodiments can provide fast and efficient sensing. Embodiments of the present disclosure may be implemented and used in various applications and vision systems, such as security systems, autonomous vehicles, and other systems that benefit from rapid and efficient motion or event detection. Although embodiments of the present disclosure are described with general reference to a vision system, it will be appreciated that such a system may part of a camera, a LIDAR, or other sensor system.

In extant image or video processing systems, image sensors may acquire and process visual information in order to reconstruct images. An image or video acquisition and processing system can include an array of photosensors, each of which may acquire visual information in order to reconstruct an image representation of the visual scene. This process may be repeated at a predetermined rate.

Event-based (EB) vision sensors can pixel-individually detect temporal contrast exceeding a preset relative threshold to follow the temporal evolution of relative light changes (contrast detection, CD) and to define sampling points for frame-free pixel-level measurement of absolute intensity (exposure measurement, EM). EB sensors have gained popularity in high-speed, low-power machine vision applications thanks to temporal precision of recorded data, inherent suppression of temporal redundancy resulting in reduced post-processing cost, and wide intra-scene dynamic range operation. Information about temporal contrast (CD) can be encoded in the form of "events": data packets containing the originating pixel's X,Y coordinate, time stamp, and contrast polarity. To maximally benefit from the ability of the individual pixel to sample visual information at high temporal precision, early time-stamping and high readout throughput can be crucial to preserve event timings.

In some embodiments, for real-time artificial vision (also referred to as "computer vision" or "machine vision"), a vision acquisition and processing system can be configured to acquire and process only data representing a change of current visual information with respect to previously acquired visual information. Such sensors or vision systems may not generate frames of images. Such visual sensors can include, for example, a temporal contrast (TC) sensor, a contrast detection (CD) sensor, or a dynamic vision sensor (DVS). Such sensors are referred to as "event-based vision sensors" in this disclosure.

For example, a TC sensor does not record image by frames like extant image systems. Instead, each pixel of the TC sensor can determine a time derivative of the light it senses. In some embodiments, optionally, the pixel can further perform some processing on the time derivative. When the time derivative exceeds a preset threshold value, the pixel can generate an "event" by outputting a signal. With short latency, the pixel can further transmit data related to the event. In some embodiments, the transmitted data can include a location (e.g., x- and y-coordinate) of the pixel located within the TC sensor (e.g., having a two-dimensional pixel matrix). In some embodiments, the transmitted data can include with a sign bit representing polarity (e.g., positive or negative sign) of temporal evolution of light intensity sensed by the pixel. In some embodiments, the transmitted data can include a timestamp of occurrence of the event. In some embodiments, the transmitted data of the pixel can include a flow of (x,y,s) values, in which x and y represent the coordinates of the pixel and s represents the polarity. The value of s may represent a relative change of the light intensity detected by the pixel, in which the value of s can represent the magnitude of the change, and the sign of s can represent the direction of the change (e.g., increasing or decreasing). Typically, the pixel circuit of the TC sensor may operate asynchronously. That is, the pixel circuit of the TC sensor are not typically quantized to a time-base (e.g., not clocked).

An event-based vision sensor (e.g., a TC sensor) can use Address-Event-Representation Readout (AER) for data readout. In some embodiments, the AER can use a handshake protocol (e.g., a synchronous or asynchronous handshake protocol) between the pixels and the readout periphery of the event-based vision sensor. In some embodiments, the AER can be arranged at a later stage in the readout system. In some embodiments, the AER can be arranged between the chip of the event-based vision sensor and an external data receiver.

In some embodiments, a readout cycle of an event can include two separate handshake cycles. For example, a pixel can send a request signal to the row-direction readout periphery for row selection. Additionally, or optionally, after receiving a row acknowledge signal (e.g., signifying successful row-selection), the pixel can send a request signal to the column direction of the readout periphery. The readout cycle for outputting the event by the pixel may end when the pixel receives a column acknowledge signal (e.g., signifying successful column-selection). In some embodiments, after receiving the row acknowledge signal, the readout cycle may end (i.e., the pixel does not send a request signal to the column direction of the readout periphery or wait for a column acknowledge signal).

In this disclosure, "row" and "column" refer to two different dimensions of the readout periphery, the naming of which is arbitrary. Both dimensions of the readout periphery can be swapped without changing the function of the readout periphery. For ease of explanation and without causing ambiguity, hereinafter, the first and second dimensions accessed by the pixel is referred to as "row" and "column," respectively, which are designated with dimension designators "Y" and "X," respectively.

In some cases, two or more pixels may access the row-direction readout periphery at the same time for selecting rows for readout. In those cases, an arbiter circuit can be used to prioritize the requests. In some embodiments, the arbiter can be implemented as an asynchronous logic circuit or a synchronous (e.g., clocked) logic circuit using a handshake approach for communication. In some embodiments, simple scanners can be used to control the sequence of active row selections.

For an event vision sensor (e.g., a TC sensor) with a readout implementing a handshake protocol (e.g., a synchronous or asynchronous handshake protocol), there still exists a risk (referred to as "readout lock risk" or "readout lock problem") that the readout may be blocked when a request in the readout system is not acknowledged, which may halt the handshake protocol. For example, this may happen if a pixel detects a temporal contrast event and generates a corresponding row-request (reqY) signal, but before the row-acknowledge (ackY) signal is generated by the readout periphery, the temporal contrast event disappears (e.g., a voltage signal related to the pixel's light input having crossed the detection threshold may drop below the detection threshold, causing the comparator to switch back to an inactive state). In such cases, the pixel cannot generate any column-request (reqX) signal (because the temporal contrast event disappears), and the readout system freezes in the middle of the event readout sequence (i.e., the readout system waits for the pixel to complete the request signal generation protocol). Before a new event occurs in one of the pixels in the same row and potentially unlocks the system, all readout of all pixels of the event-based vision sensor can be halted for an indefinite amount of time. This undesired behavior may lead to a temporarily non-functioning device and potential data loss.

According to an aspect of the present disclosure, a readout system for an event-based vision sensor is described that addresses the above risks and drawbacks. The event-based vision sensor may have a plurality of pixels. As used herein, a "pixel" refers to a smallest element of the sensor that converts light into an electrical signal. Also, as disclosed herein, the pixels may be provided in an array of any suitable size and shape for the sensing system.

FIG. 1 is a schematic representation of exemplary architecture of a pixel 100 of an event-based vision sensor, according to embodiments of the present disclosure. In some embodiments, a pixel may include a photosensitive element 102. For example, photosensitive element 102 may include a photodiode (e.g., in a p-n junction or PIN structure) or any other element configured to convert light 104 into an electrical signal. Photosensitive element 102 may generate a current $I_{ph}$ proportional to the intensity of light 104 impinging on photosensitive element 102.

In some embodiments, each pixel may further include a photo-signal converter (not shown in FIG. 1) connected to photosensitive element 102. The photo-signal converter may be configured to provide on a first output a current signal that is linearly proportional to the intensity of light impinging on photosensitive element 102, and to provide on a second output a voltage signal that is logarithmic with the intensity of light 104 impinging on photosensitive element 102. For example, the photo-signal converter may include a plurality of transistors (not shown in FIG. 1), such as metal-oxide-semiconductor (MOS) transistors, complementary metal-oxide-semiconductor (CMOS) transistors, or any other three-terminal circuit element configured to amplify or switch electronic signals.

In some embodiments, each pixel may further include a detector (not shown in FIG. 1). The detector may be configured to generate, autonomously and independently of detectors of other pixels, a trigger signal when a signal of the detector proportional to the voltage signal of the second output of the photo-signal converter exceeds a threshold. For example, the detector may include one or more voltage comparators and one or more capacitors arranged to reset upon receive of a control signal and to send the trigger signal when the threshold is exceeded. In this disclosure, various forms of capacitors may be used. For example, the capacitor can be a discrete device including two parallel (or substantially parallel) plates, optionally with a dielectric therebetween, or to parasitic capacitance present at a circuit node (e.g., due to a semiconductor implementation of other circuit elements). Other forms of capacitors are also possible, such as a metal-oxide-semiconductor (MOS) capacitor, a metal-insulator-metal (MiM) capacitor, a metal fringe capacitor, a trench capacitor, or the like.

By way of further example, as shown in FIG. 1, pixel 100 includes photosensitive element 102 (e.g., a partially pinned photodiode), a subthreshold MOS based logarithmic photo-current-to-voltage converter 106 (shown as "log IN converter 106" in FIG. 1), an asynchronous delta-modulation or "level-crossing" sampler 108 (shown as "ADM 108" in FIG. 1), a voltage comparator 110 (e.g., for both polarities), a logic with ADM control (shown as "$CTRL_{ADM}$" between ISL 112 and ADM 108 in FIG. 1), and an interface and state-logic (shown as "ISL 112" in FIG. 1) to a read-out periphery.

Figure 2:
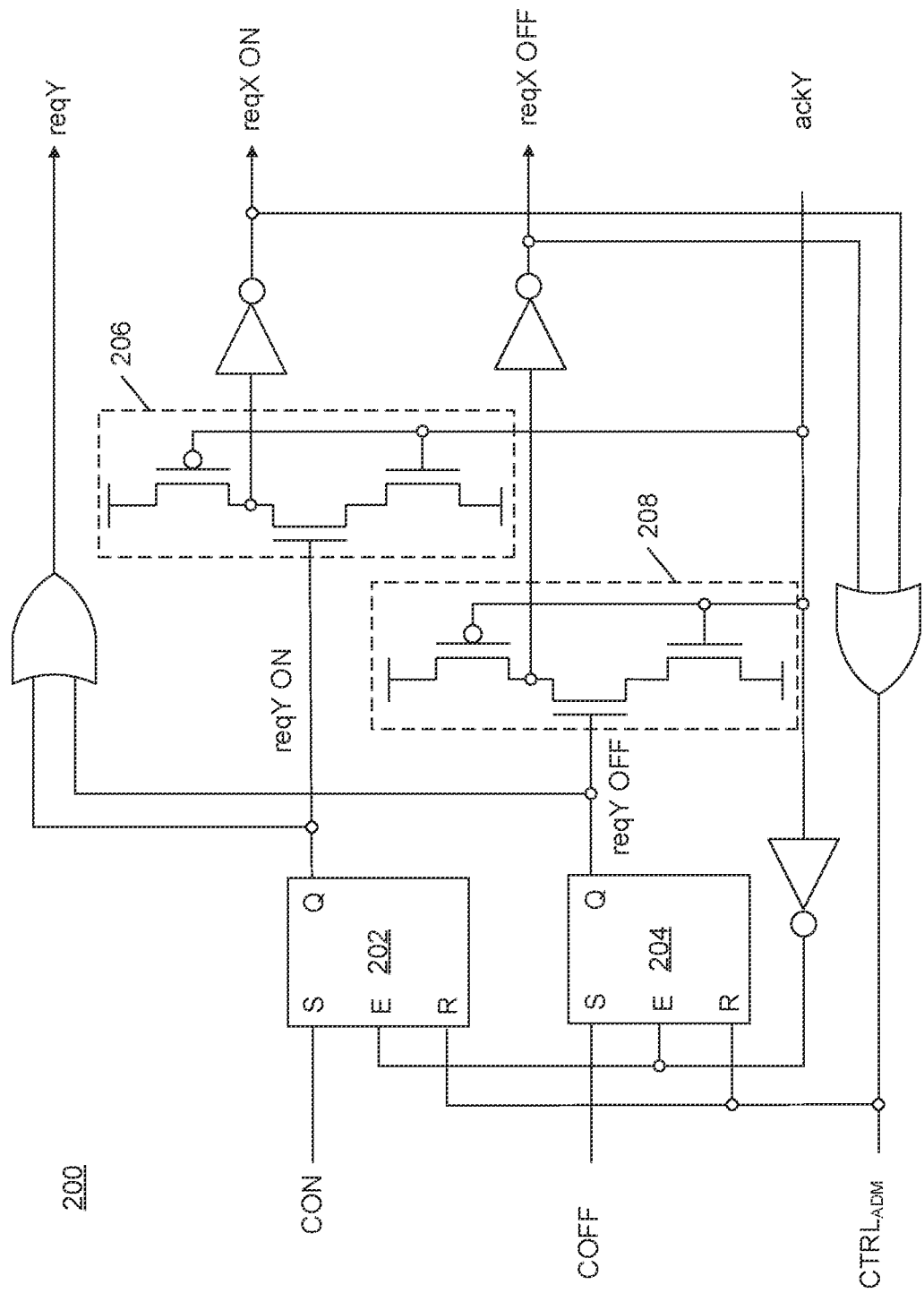
FIG. 2 is a schematic representation of exemplary architecture of a readout interface for a pixel of an event-based vision sensor, according to embodiments of the present disclosure.

FIG. 2 is a schematic representation of exemplary architecture of a readout interface 200 for a pixel of an event-based vision sensor, according to embodiments of the present disclosure. Readout interface 200 can be used to implement an interface and state-logic or ISL 112 of FIG. 1. In some embodiments, each pixel of the event-based vision sensor can include a readout interface similar to readout interface 200.

Readout interface 200 may mitigate the readout lock risk by adding at least one memory element (e.g., a latch) to every pixel. The memory element can immediately "lock" each event of temporal contrast detected by a pixel. This lock can only be released by a corresponding acknowledge signal received by the same pixel. This lock cannot be released by the same pixel that detects a further change in light signal incident thereto, which can ensure the completion of the request generation protocol of the same pixel.

As shown in the example embodiment of FIG. 2, readout interface 200 includes two input latches 202 and 204. In some embodiments, the input latches 202 and 204 can reduce power when the comparator switching (e.g., the switching of voltage comparator 110 of FIG. 1) is slow. In some embodiments, the input latches 202 and 204 can further prevent or reduce ringing. In some embodiments, the input latches 202 and 204 are associated with gated latches 206 and 208, respectively. Gated latches 206 and 208 can prevent late request generation or event loss. In some embodiments, the input latches 202 and 204 of readout interface 200 can store only pixels with events.

Each of the input latches 202 and 204 may include a SET input (represented as "S") and a RESET input (represented as "R"). A first input latch 202 may have its SET input electrically coupled to a first output of a comparator (e.g., voltage comparator 110 of FIG. 1) that detects positive polarity (represented as "CON" in FIGS. 1-2) of temporal contrasts. A second input latch 204 may have its SET input electrically coupled to a second output of the comparator (e.g., voltage comparator 110 of FIG. 1) that detects negative polarity (represented as "COFF" in FIGS. 1-2) of temporal contrasts. If a temporal contrast is detected and one of the outputs (e.g., CON or COFF) of the comparator is activated, the corresponding latch (e.g., first input latch 202 or second input latch 204) may change its state. When CON is activated, first input latch 202 may send out a row-request signal indicative of positive polarity (represented as "reqY ON" in FIG. 2) via its output (represented as "Q") for row selection. When COFF is activated, second input latch 204 may send out a row-request signal indicative of negative polarity (represented as "reqY OFF" in FIG. 2) via its output (represented as "Q") for row selection. After successful row selection, a row selection circuit (e.g., row selection circuit 302 in FIG. 3) can send an acknowledge signal (represented as "ackY" in FIG. 2) to readout interface 200 (e.g., to both input latches 202 and 204). After receiving ackY, readout interface 200 can be triggered to send the event locked in the input latches 202 and 204. For example, when CON is activated and reqY ON is sent, first input latch 202 can send its locked event (represented as "reqX ON" in FIGS. 1-2). For another example, when COFF is activated and reqY OFF is sent, second input latch 204 can send its locked event (represented as "reqX OFF" in FIGS. 1-2). When the readout is in progress (e.g., when at least one of input latches 202 or 204 is sending out its locked event), readout interface 200 can be triggered by ackY to activate a signal to deactivate both input latches 202 and 204 via their enabling inputs (represented as "E") to disable CON and COFF paths for preventing event lost. After completing the readout, readout interface 200 can then be triggered to activate a control signal (shown as "CTRL$_{ADM}$" in FIGS. 1-2) to the RESET inputs (represented by "R") of the two input latches 202 and 204 for resetting both input latches. No change of CON or COFF has any effect on resetting the input latches 202 and 204.

Figure 3:
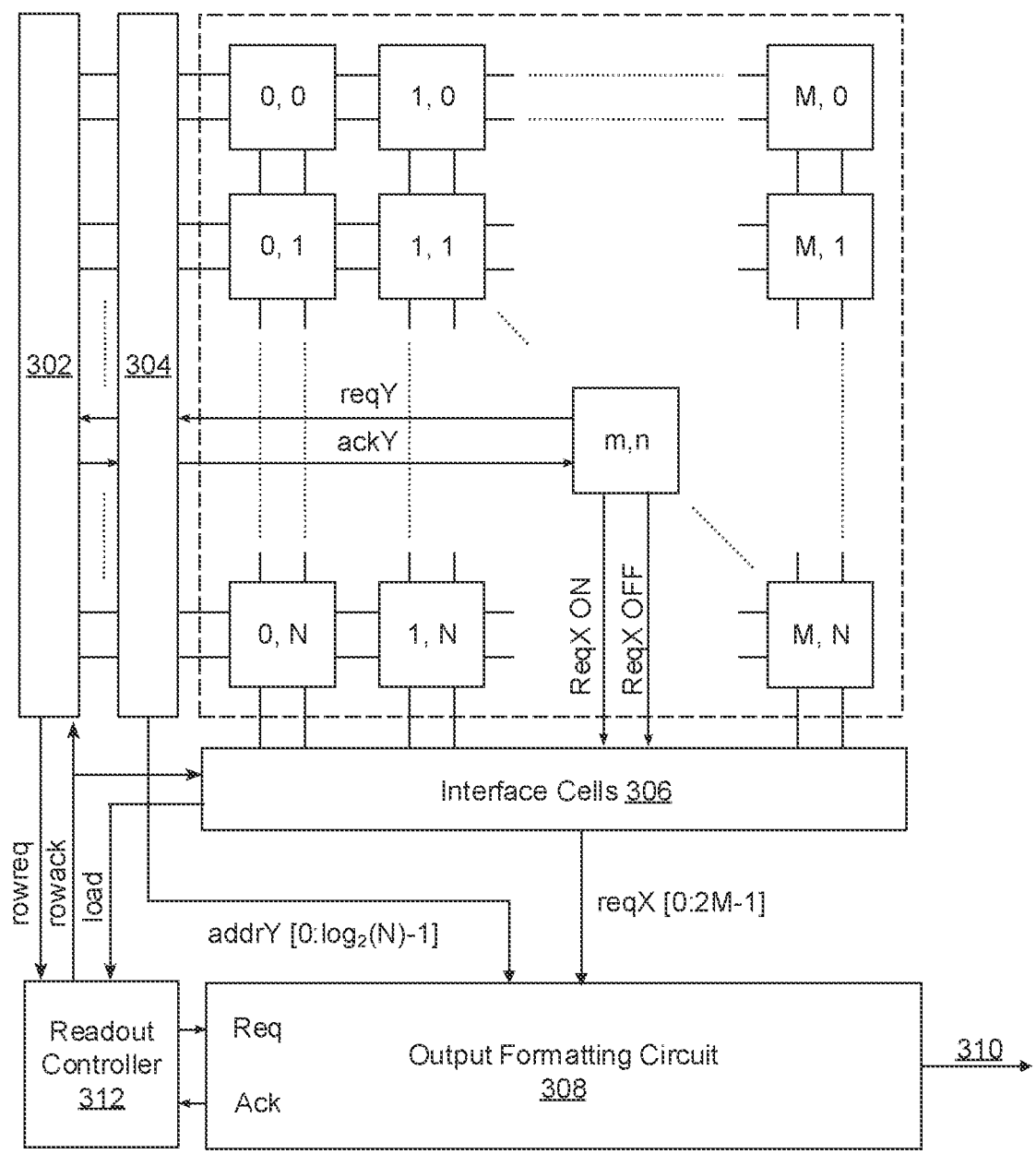
FIG. 3 is a schematic representation of an exemplary circuit for an event-based vision sensor, according to embodiments of the present disclosure.

FIG. 3 is a schematic representation of an exemplary circuit 300 for an event-based vision sensor, according to embodiments of the present disclosure. Circuit 300 includes an array of pixels, the coordinates of which are represented by (0,0), (1,0), ..., (M,N). Each of the pixels (e.g., a pixel at coordinate (m,n)) can send a row-request signal (represented as "reqY" in FIG. 3) to a row selection circuit 302 electrically coupled to the pixel and receive a row-selection acknowledge signal (represented as "ackY" in FIG. 3) from row selection circuit 302. After receiving ackY, the pixel can further activate a column-request signal (represented as "reqX" in FIG. 3) to interface cells for activating data readout. The "ON" and "OFF" following reqX can represent the polarity of the output data of the pixel. The data outputted by the pixels of the selected row ("reqX[0:2M−1]") to interface cells 306 (e.g., a total of 2M interface cells labeled as [0:2M−1]) can be further outputted by the interface cells 306 to an output formatting circuit 308. A row address encoder 304 (referred to as "y-address encoder 304") can be electrically coupled to the pixels and extract the coordinates (represented as "addrY[0:log$_2$(N)−1]" in FIG. 3) of the pixels of the selected row and output the coordinates to output formatting circuit 308. Output formatting circuit 308 can combine reqX[0:2M−1] and addrY[0:log$_2$(N)−1] to output them as formatted data 310. A readout controller 312 can control output formatting circuit 308, interface cells 306, and row selection circuit 302.

In some embodiments, to mitigate the readout lock problem, each pixel of circuit 300 can be pixel 100, the ISL of which can include a readout interface 200.

In some embodiments, to reduce additional components inside each pixel, an external "watchdog" timer circuit (not shown in FIG. 3) can be used in the event-based vision sensor to mitigate the readout lock problem. This timer circuit can unlock the readout system after a preset time of inactivity after receiving the last ackY signal from row selection circuit 302, no matter whether reqX is received by interface cells 306. In some embodiments, the preset time may be programmable.

Figure 4:
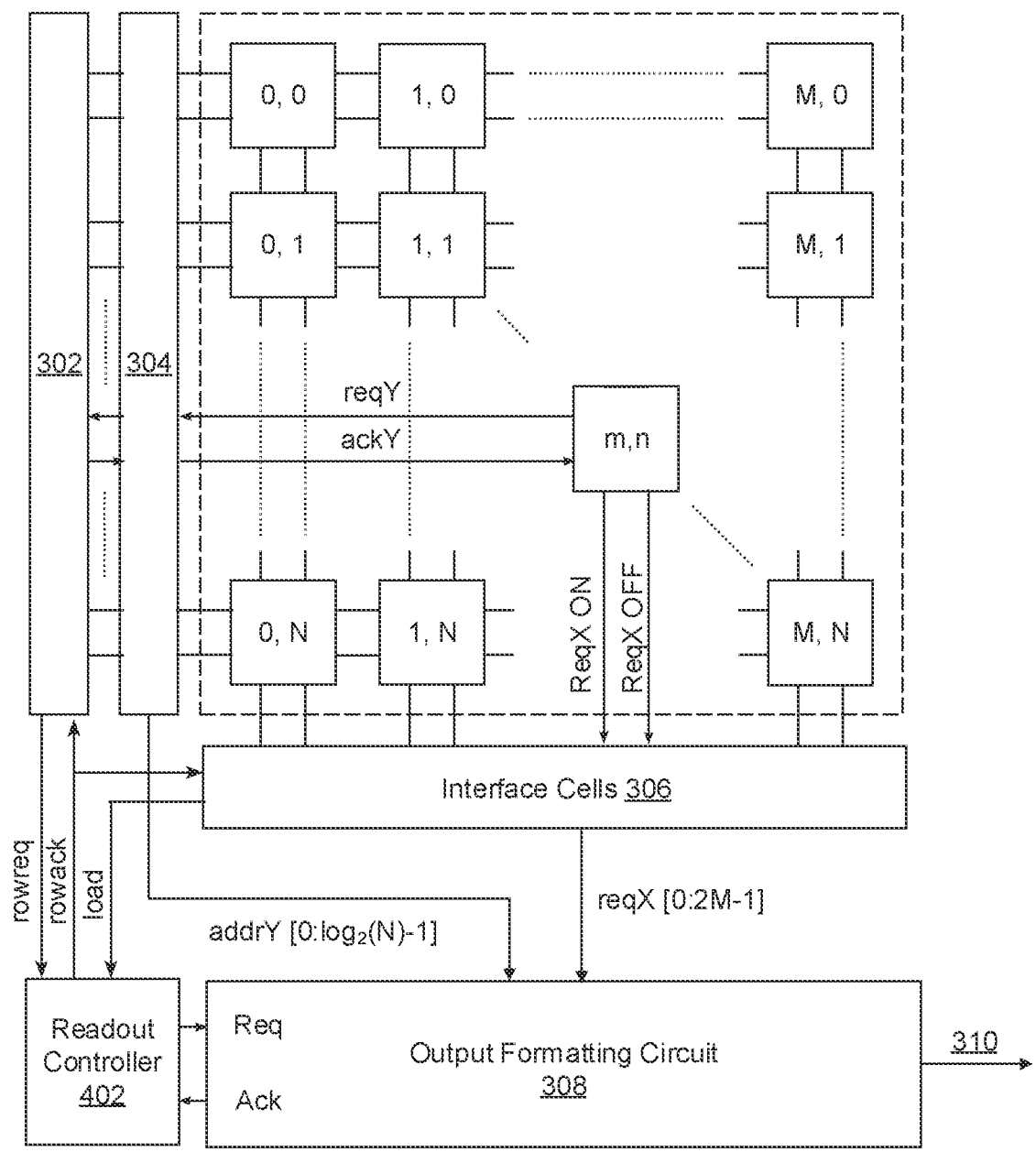
FIG. 4 is a schematic representation of another exemplary circuit for an event-based vision sensor, according to embodiments of the present disclosure.

FIG. 4 a schematic representation of another exemplary circuit 400 for an event-based vision sensor, according to embodiments of the present disclosure. Compared with circuit 300, readout controller 402 of circuit 400 includes a timer circuit (e.g., the external "watchdog" timer circuit as described above).

In some embodiments, when a pixel (e.g., pixel (m,n)) in a row (e.g., row n) of circuit 400 detects a temporal contrast event, the pixel can send the row-request signal (reqY) to row selection circuit 302. In turn, as the row is successfully selected by row selection circuit 302 in response to receiving reqY, row selection circuit 302 can send back an acknowledge signal ackY to some or all pixels of the active row (e.g., row n). Also, row selection circuit 302 can generate a "rowreq" signal and send it to readout controller 402. The "rowreq" signal can start the timer circuit. The y-address encoder 304 can construct the row address for the active row and output them as addrY[0:log$_2$(N)−1].

After receiving ackY, all pixels (the pixel that triggered sending reqY, if still activated, and any pixel that has detected new events in the active row after reqY being sent and before ackY being received) that detected an event in the active row can send a reqX to interface cells 306 and remove their reqY signals. Accordingly, the common row-request (reqY) signal line of the active row can be deactivated.

Interface cells 306 can sample reqX[0:2M−1] into their memory elements and signify to readout controller 402 using a load signal (represented as "load" in FIG. 4). After receiving the load signal, readout controller 402 can send a "rowack" signal to row selection circuit 302 to reset row selection circuit 302. Then, row selection circuit 302 can release ackY to the active row. The deactivation of the common ackY signal line can cause the active pixels in the active row to remove their activated reqX signals, which concludes the readout cycle. A new row can now be selected by row selection circuit 302 in response to receiving another reqY.

In some embodiments, when the readout lock occurs and the readout system freezes, circuit 400 can be unlocked by the rowack signal controlled by the timer circuit in readout controller 402 as follows. After readout controller 402 receives the rowreq signal, if no reqX signal is transferred to interface cells 306 (e.g., no event to be read out) after a preset time, hence readout controller 402 receiving no load signal, readout controller 402 can activate to send the rowack signal to row selection circuit 302 for resetting row selection circuit 302. After resetting, row selection circuit 302 can release ackY of the active row. A new row can now be selected by the row selection circuit in response to receiving another reqY.

In some embodiments, the preset time can be programmed such that all active pixels in a row can complete sending their reqX without being interrupted, independent from the number and distribution of the active pixels in the active row.

Figure 5:
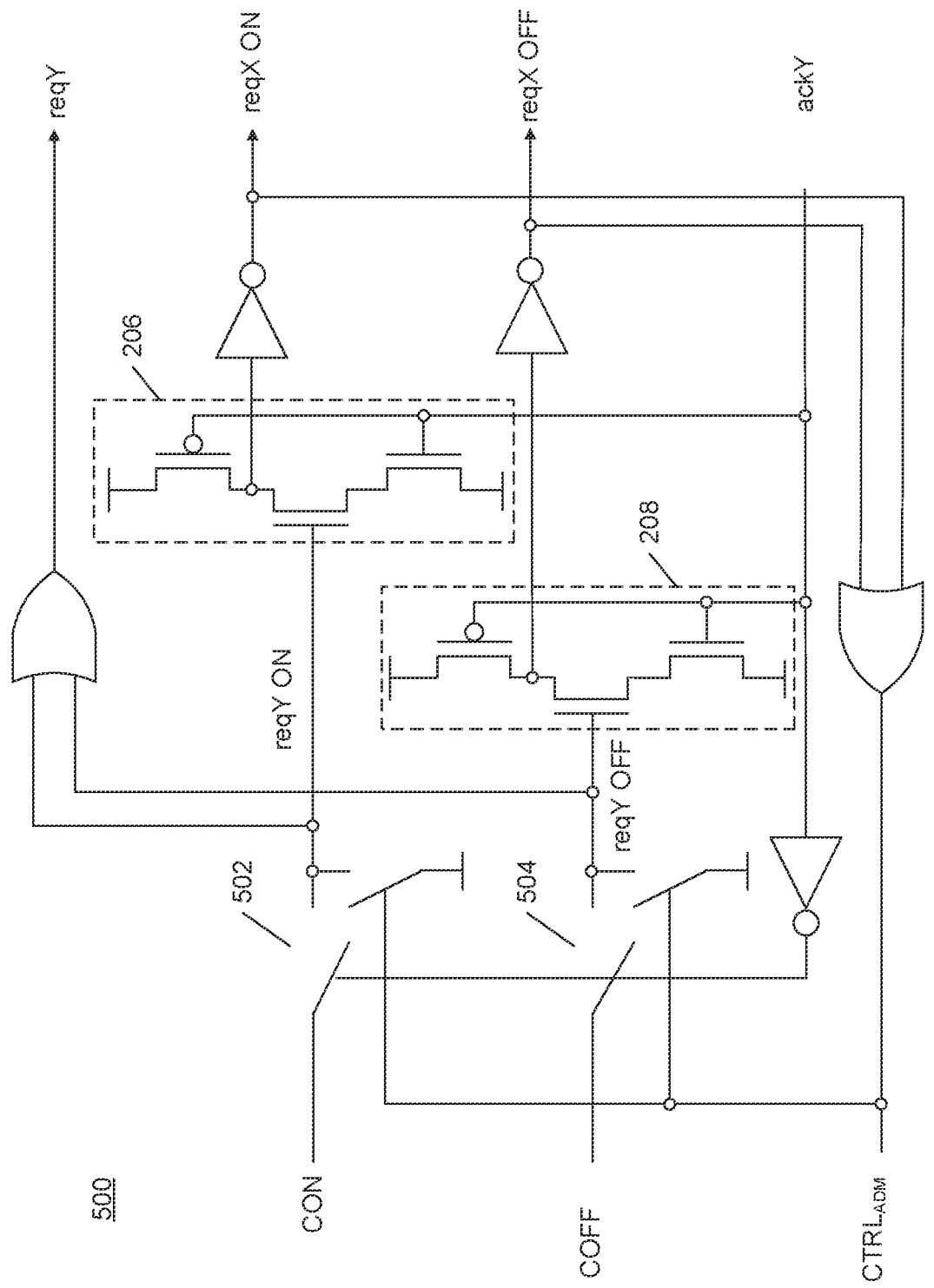
FIG. 5 is a schematic representation of exemplary architecture of another readout interface for a pixel of an event-based vision sensor, according to embodiments of the present disclosure.

FIG. 5 is a schematic representation of exemplary architecture of another readout interface 500 for a pixel of an event-based vision sensor, according to embodiments of the present disclosure. Compared with FIG. 2, readout interface 500 is similar to readout interface 200 but does not include any input latch. In some embodiments, pixels of circuit 400 in FIG. 4 can be pixel 100, the ISL of which can include readout interface 200 or 500. By doing so, circuit 400 can mitigate the readout lock problem without significantly adding additional components to the circuit.

In FIG. 5, readout interface 500 includes two switches 502 and 504 for each of the output of the comparator (i.e., each of the CON and COFF paths). For each of the CON and COFF paths, a first switch 502 is connected to the output of the comparator (e.g., voltage comparator 110 in FIG. 1), and a second switch 504 is connected to ackY path. When CON (or COFF) is activated, first switch 502 can be connected to send out reqY ON (or reqY OFF) for row selection. After successful row selection, a row selection circuit (e.g., row selection circuit 302 in FIGS. 3-4) can send ackY to readout interface 500. After receiving ackY, readout interface 500 can be triggered to send the event. For example, when CON is activated and reqY ON is sent, readout interface 500 can send reqX ON. For another example, when COFF is activated and reqY OFF is sent, readout interface 500 can send reqX OFF. When the readout is in progress (e.g., when the event is being sent), readout interface 500 can be triggered by ackY to disconnect the switches 502 and 504 to disable the CON and COFF paths for preventing event lost. After completing the readout, readout interface 500 can then be triggered to activate $CTRL_{ADM}$ to reset (e.g., by grounding) reqX ON and reqX OFF.

Figure 6:
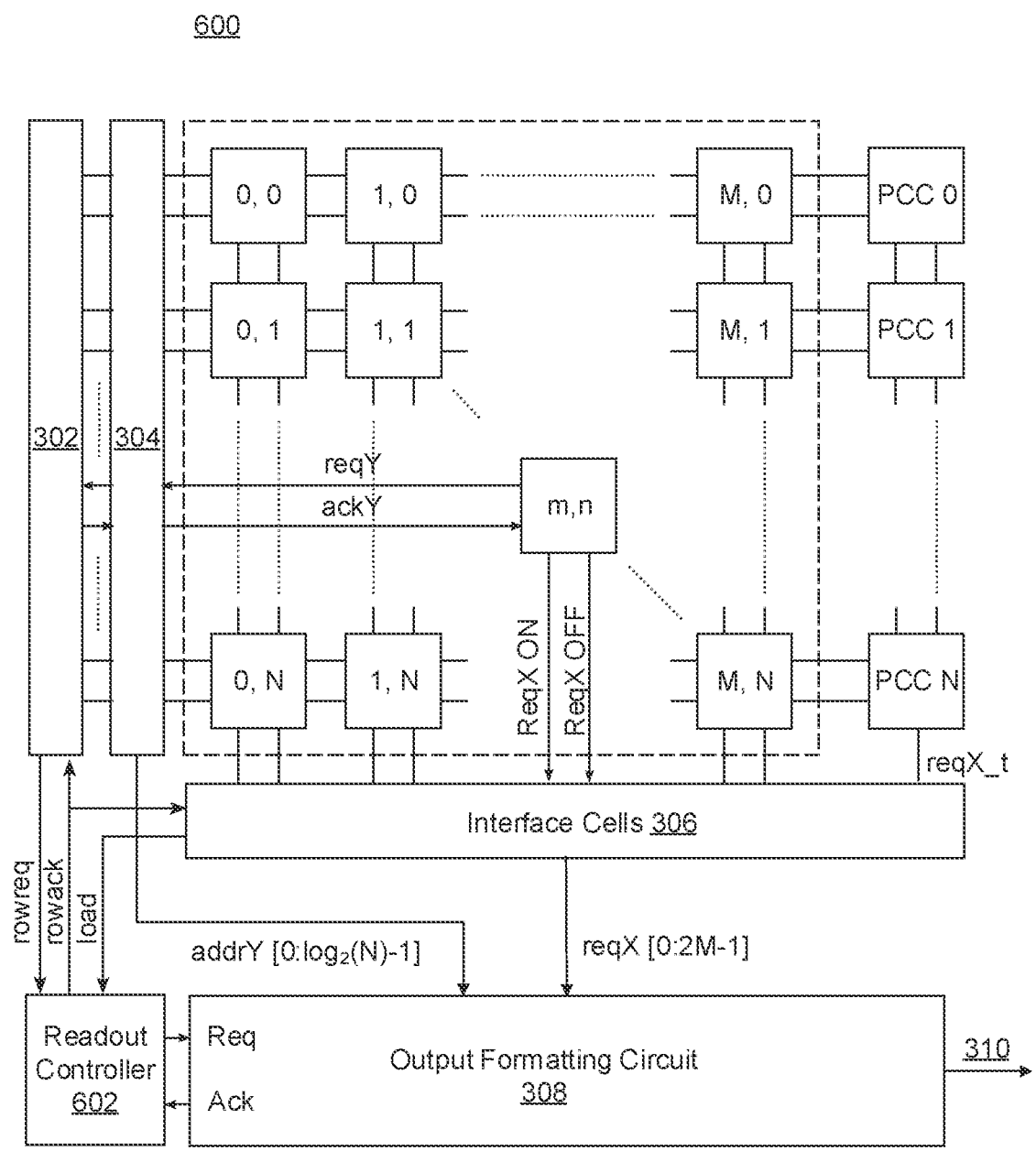
FIG. 6 is a schematic representation of a still further exemplary circuit for an event-based vision sensor, according to embodiments of the present disclosure.
Figure 7:
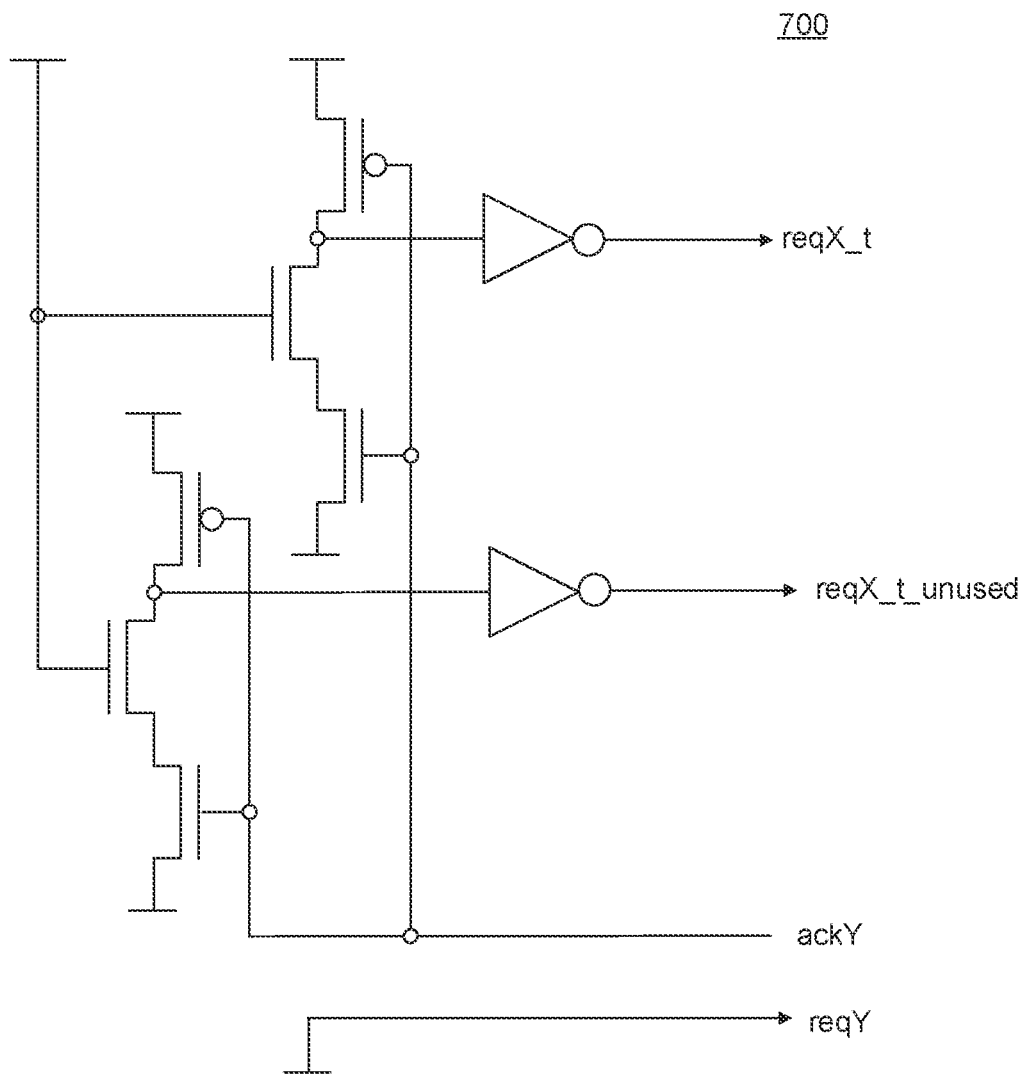
FIG. 7 is a schematic representation of exemplary architecture of a protocol control circuit in FIG. 6, according to embodiments of the present disclosure.

In some embodiments, to mitigate the readout lock problem, a protocol control circuit can be added to the end of every row of pixels in circuit 300 of the FIG. 3 embodiment. FIG. 6 is a schematic representation of exemplary circuit 600 for an event-based vision sensor, according to embodiments of the present disclosure. Circuit 600 is similar to circuit 300 but additionally includes protocol control circuits (represented by "PCC 0," "PCC 1," ..., "PCC N"). In some embodiments, pixels of circuit 600 can be pixel 100, the ISL of which can include readout interface 200 or 500. By doing so, circuit 600 can mitigate the readout lock problem without significantly adding additional components to the circuit. FIG. 7 is a schematic representation of exemplary architecture of a protocol control circuit 700 for use in FIG. 6, according to embodiments of the present disclosure. Protocol control circuit 700 can be triggered to generate a column-request signal (represented as "reqX_t" in FIG. 7) when the row that it is electrically coupled to is selected and when it receives ackY. Protocol control circuit 700 can be similar to the output part of a pixel interface to have the same electrical properties as a pixel.

Referring back to FIG. 6, in some embodiments, the protocol control circuits can be added opposite row selection circuit 302. In some embodiments, the protocol control circuits can be electrically coupled to the readout system similar to the pixels in a row. Unlike the pixels that can only generate reqX when being active after receiving ackY, the protocol control circuits can always generate and send a protocol column-request signal (represented as "reqX_t" in FIG. 6) to interface cells 306 in response to receiving ackY from row selection circuit 302.

In some embodiments, as shown in FIG. 6, the protocol control circuits can be arranged to have a distance to row selection circuit 302 longer than any of the pixels of the same row. By doing so, any signal generated by row selection circuit 302 arrives at the protocol control circuits last (i.e., all pixels of the same row receive the signal before the protocol control circuit). In turn, the activation of reqX_t occurs when a protocol control circuit receives ackY. Because the protocol control circuit is placed at the end of the row (i.e., with the longest distance to row selection circuit 302, compared with the pixels of the selected row), the protocol control circuit can receive ackY just after the last pixel in the row, and all reqX (e.g., reqX ON or reqX OFF) from active pixels can be sent for readout before reqX_t is sent. Because reqX_t can always be generated, even if there is no active pixel sending reqX, the continuation of the readout process can always be triggered, by which the readout lock problem can be prevented. Also, by the design of circuit 600, if there is no active pixel sending reqX, reqX_t can be generated with minimal delay. In this manner, if the readout lock problem occurs, the time needed for unlocking the readout process can be automatically minimized. Also, the risk of data loss and unnecessary delay can be minimized. Circuit 600 can be robust to device mismatches, process variations, temperature variations, or any other working conditions.

In some embodiments, when interface cells 306 receive reqX_t, it can send the load signal to readout controller 602 (e.g., similar to readout controller 312 in FIG. 3) to signify that no reqX signal was received from the pixels of the active row. After receiving the load signal, readout controller 602 can send the rowack signal to row selection circuit 302. After receiving the rowack signal, row selection circuit 302 can be reset and release ackY of the active row. A new row can now be selected by row selection circuit 302 in response to receiving another reqY.

In some embodiments, circuit 600 can additionally include a timer circuit (e.g., the timer circuit in circuit 400 of FIG. 4) in readout controller 602 (e.g., similar to readout controller 402 in FIG. 4). In some embodiments, pixels of circuit 600 can be pixel 100, the ISL of which can include readout interface 200 or 500. In some embodiments, circuit 600 can additionally include a timer circuit in readout controller 602, and pixels of circuit 600 can be pixel 100, the ISL of which can include readout interface 200 or 500. By doing so, the readout lock problem can be avoided by at least two alternative, independent mechanisms. By such redundant designs, the possibility of the readout lock problem can be further suppressed.

Figure 8:
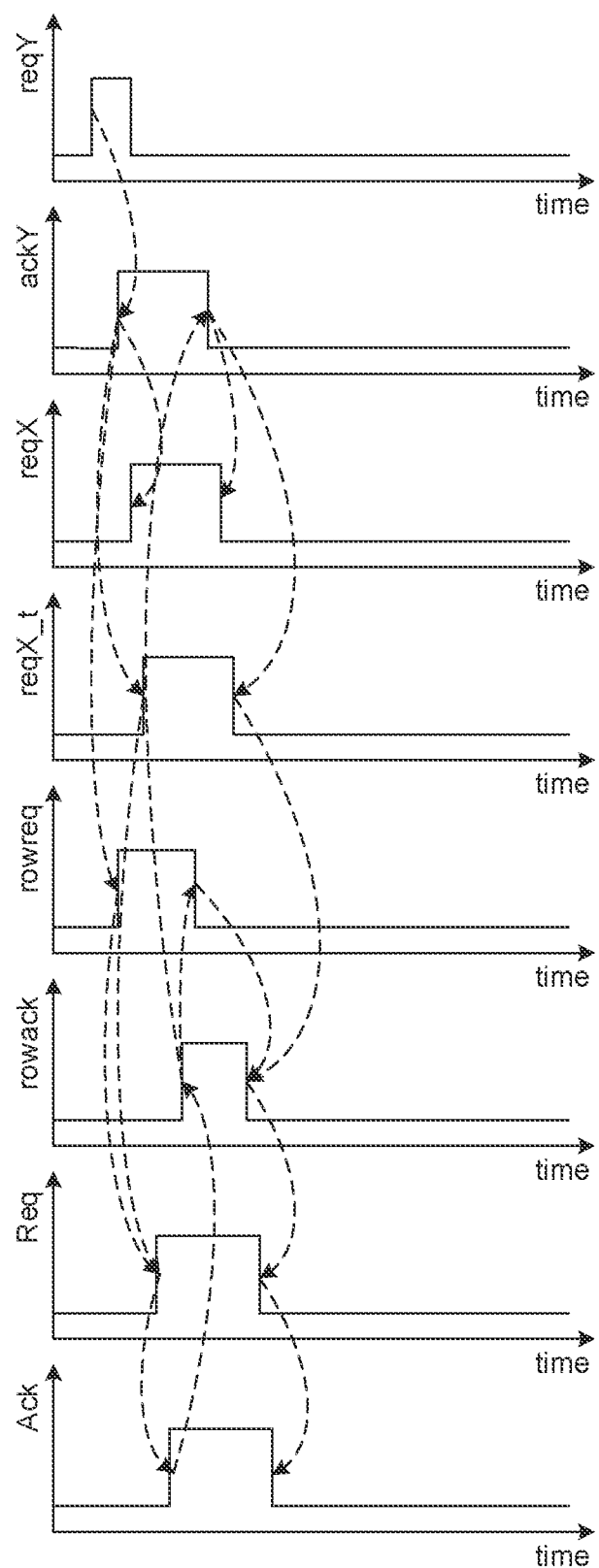
FIG. 8 is a schematic representation of a signal timing diagram for a readout circuit of an event-based vision sensor, according to embodiments of the present disclosure.

FIG. 8 is a schematic representation of a signal timing diagram for a readout circuit of an event-based vision sensor, according to embodiments of the present disclosure. In FIG. 8, the timelines of different signals are aligned, and the arrowed dash lines indicate the triggering relationship between the signals. FIG. 8 shows two handshake cycles of circuit 600, in which the first handshake cycle starts from the activation of reqY and ends at the activation of Ack, and the second handshake cycle starts from the activation of Ack and ends at the deactivation of Ack.

As shown in FIG. 8, when a pixel in a row detects a temporal contrast event, the pixel can activate the reqY signal. As the row is successfully selected by a row selection circuit (e.g., row selection circuit 302 in FIG. 6) in response to the reqY, the row selection circuit can activate ackY to the active row.

The activation of ackY can further activate three signals: reqX generated by an active pixel (e.g., pixel (1,1) in FIG. 6) of the active row, reqX_t generated by a protocol control circuit (e.g., PCC 1) in the active row after all pixels of the active row receive ackY, and rowreq generated by the row selection circuit. For the active row, all active pixels after receiving ackY can generate a reqX signal, as described previously.

A readout controller (e.g., readout controller 602 in FIG. 6) can receive the load signal derived from the reqX_t signal generated by the protocol control column and activate a Req signal to an output formatting circuit (e.g., output formatting circuit 308 in FIG. 6). The output formatting circuit can receive reqX[0:2M−1] from interface cells (e.g., interface cells 306 in FIG. 6) and addrY[0:log 2(N)−1] from a y-address encoder (e.g., y-address encoder 304 in FIG. 6). After completing the reception of reqX[0:2M−1] and addrY [0:log 2(N)−1], the output formatting circuit can output the data and activate Ack to the readout controller.

In some embodiments, if no reqX[0:2M−1] is received by the interface cells, the interface cells will eventually receive reqX_t sent by the protocol control circuit, which can further activate the load signal (not shown in FIG. 8) to the readout controller. When receiving the load signal, the readout controller can activate Req to the output formatting circuit to continue the protocol, even if no reqX signals are active. Subsequently, the output formatting circuit will suppress the readout of the empty row.

When receiving Ack from the output formatting circuit, the readout controller can activate rowack to the row selection circuit. In turn, the row selection circuit can deactivate two signals: rowreq and ackY. The deactivation of ackY can trigger to deactivate reqX, reqX_t, rowack, Req, and Ack. The deactivation of rowreq can indicate to the readout controller that ackY is deactivated and can further deactivate rowack in turn.

Figure 9:
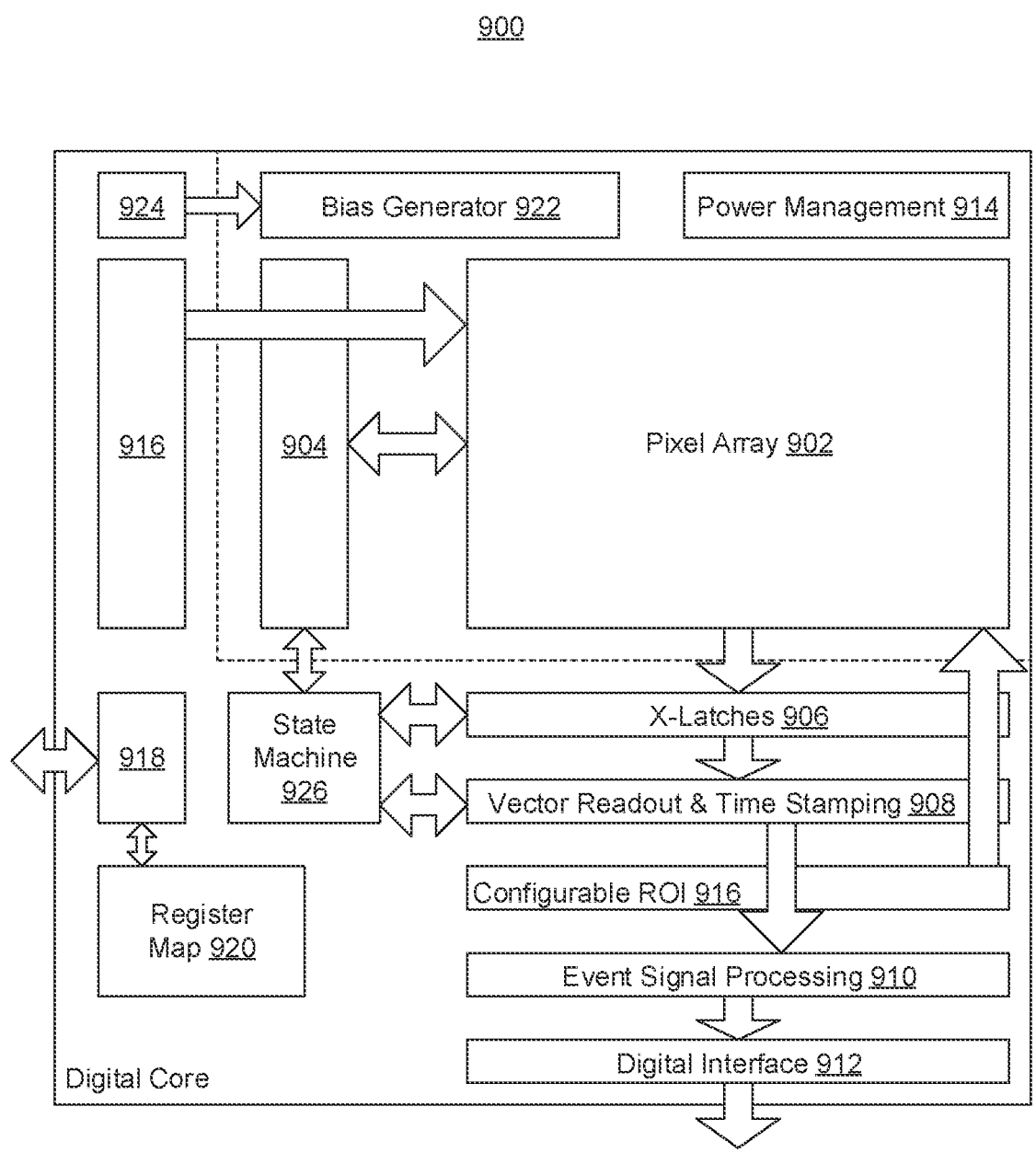
FIG. 9 is a schematic representation of exemplary architecture of a chip-top circuit design for an event-based vision sensor, according to embodiments of the present disclosure.

FIG. 9 is a schematic representation of exemplary architecture of a chip-top circuit 900 for an event-based vision sensor, according to embodiments of the present disclosure. Chip-top circuit 900 includes a pixel array 902. By way of example, pixel array 902 can have a surface aspect ratio of 16:9 (e.g., 1280×720 pixels). Chip-top circuit 900 can also include an asynchronous readout circuit 904 ("Y arbiter" or "row selector") for selective readout (e.g., readout of a row of pixels), X-latches 906 for storing (e.g., temporarily storing) pixel data from a selected readout (e.g., a row of pixels selected by asynchronous readout circuit 906), and a vector-readout and time stamping circuit 908 for receiving data from X-latches 906 and synchronizing, packetizing, and time-stamping (e.g., by attaching a digital time stamp to a data packet) the received data. Further, chip-top circuit 900 can include an event signal processing (ESP) circuit 910 for receiving data from vector-readout and time stamping circuit 908 and filtering, formatting, and pre-processing the received data, and a digital interface 912 for receiving data from ESP circuit 910 for sending the data off-chip. By way of example, digital interface 912 can be implemented as a serial interface, a parallel interface, a low-voltage differential signaling (LVDS) interface, a mobile industry processor interface (MIPI), or another suitable type of interface. In one embodiment, digital interface 912 is implemented as a parallel interface and has a suitable width, such as a 16-bit width.

Referring again to FIG. 9, chip-top circuit 900 can further include an on-chip power management circuit 914 for a high-level integration of components, a configurable ROI circuit 916 for cropping or sub-sampling configurations, a digital data interface 918 (e.g., a serial peripheral interface or "SPI") for receiving setup data sent to chip-top circuit 900 at a start-up stage, a register map 920 for storing the setup data received by digital data interface 918, a bias generator 922 (e.g., a digital-to-analog converter or "DAC"), a bias generator control circuitry 924 for controlling (e.g., via SPI commands) analog circuits in bias generator 922 based on register setting data stored in register map 920, and a state machine 926 for controlling a readout protocol by receiving signals from and sending signals to asynchronous readout circuit 904, X-latches 906, and vector-readout and time stamping circuit 908. In some embodiments, ESP circuit 910 can include a look-up table (LUT) based address filter (not shown in FIG. 9) for removing selected events (e.g., from defective pixels). Consistent with embodiments of this disclosure, chip-top circuit 900 can additionally or alternatively include other components besides the examples illustrated and described in association with FIG. 9.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include circuitry and hardware, but systems and methods consistent with the present disclosure can be implemented with any suitable combination of hardware, firmware, and/or software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments disclosed herein), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A circuit for sampling data from pixels of an event vision sensor, comprising:
    a selection circuit electrically coupled to pixels of a line of the event vision sensor, the selection circuit configured to:
        receive an activation signal from an active pixel of the line,
        generate an acknowledge signal in response to receiving the activation signal, and
        send the acknowledge signal to the pixels of the line, wherein each pixel of the line is configured to generate a request-reading signal when that pixel is active when receiving the acknowledge signal;

a control circuit electrically coupled to a pixel having a largest distance to the selection circuit among the pixels of the line, the control circuit configured to:
  receive the acknowledge signal from the selection circuit, and
  generate a process-reading signal in response to receiving the acknowledge signal; and
an interface circuit electrically coupled to the pixels of the line, the interface circuit configured to cause to reset the selection circuit, the control circuit, and the pixels of the line after receiving the process-reading signal.

2. The circuit of claim 1, wherein the interface circuit is further configured to:
  generate a load signal in response to receiving the process-reading signal.

3. The circuit of claim 2, further comprising:
  a readout controller electrically coupled to the interface circuit and the selection circuit, the readout controller configured to reset the selection circuit, the control circuit, and the pixels of the line in response to receiving the load signal from the interface circuit.

4. The circuit of claim 1, wherein the request-reading signal is generated by a pixel of the line if a temporal contrast determined by the pixel exceeds a threshold when the pixel receives the acknowledge signal.

5. The circuit of claim 4, wherein the request-reading signal comprises a first status indicative of a positive change of the temporal contrast and a second status indicative a negative change of the temporal contrast.

6. The circuit of claim 1, wherein the interface circuit is further configured to receive a data signal from the pixel having generated the request-reading signal in response to receiving the request-reading signal.

7. The circuit of claim 6, further comprising:
  an address encoding circuit electrically coupled to the pixels of the line and the selection circuit, the address encoding circuit configured to generate an address signal for the pixel having generated the request-reading signal in response to receiving the acknowledge signal from the selection circuit.

8. The circuit of claim 7, further comprising:
  a formatting circuit electrically coupled to the interface circuit and the address encoding circuit, the formatting circuit configured to:
    receive the data signal from the interface circuit and the address signal from the address encoding circuit, and
    generate output data using the data signal and the address signal.

9. The circuit of claim 6, further comprising:
  a timer circuit electrically coupled to the interface circuit and the line selection circuit, the time circuit configured to:
    receive a starting signal generated by the selection circuit in response to receiving the activation signal, and
    reset the selection circuit, the control circuit, and the pixels of the line if no data signal is received by the interface circuit after a time interval from a timestamp of receiving the starting signal exceeds a threshold time.

10. The circuit of claim 9, wherein the readout controller comprises the timer circuit.

11. The circuit of claim 1, wherein the control circuit is further configured to:
  receive the acknowledge signal after all pixels of the line have received the acknowledge signal.

12. The circuit of claim 1, wherein no pixel of the line is active when receiving the acknowledge signal.

13. The circuit of claim 1, wherein the activation signal is generated by a photosensitive element of the active pixel in response to brightness of light impinging on the photosensitive element.

14. The circuit of claim 1, wherein the activation signal is generated by the active pixel when a temporal contrast determined by the active pixel exceeds a threshold.

15. A circuit for sampling data from pixels of an event vision sensor, comprising:
  a line selection circuit electrically coupled to pixels of a line of the event vision sensor, configured to:
    receive an activation signal from an active pixel of the line,
    generate an acknowledge signal and a starting signal in response to receiving the activation signal, and
    send the acknowledge signal to the pixels of the line, wherein each pixel of the line is configured to generate a request-reading signal when the pixel is active when receiving the acknowledge signal;
  an interface circuit electrically coupled to the pixels of the line, configured to receive a data signal from the pixel having generated the request-reading signal in response to receiving the request-reading signal; and
  a timer circuit electrically coupled to the interface circuit and the line selection circuit, configured to:
    receive the starting signal from the line selection circuit, and
    cause to reset the line selection circuit and the pixels of the line if no data signal is received by the interface circuit after a time interval from a timestamp of receiving the starting signal exceeds a threshold time.

16. The circuit of claim 15, further comprising:
  a readout controller electrically coupled to the interface circuit and the line selection circuit, configured to reset the line selection circuit, the control circuit, and the pixels of the line if no data signal is received by the interface circuit after the time interval from the timestamp of receiving the starting signal exceeds the threshold time.

17. The circuit of claim 16, wherein the readout controller comprises the timer circuit.

18. The circuit of claim 15, further comprising:
  an address encoding circuit electrically coupled to the pixels of the line and the line selection circuit, configured to generate an address signal for the pixel having generated the request-reading signal in response to receiving the acknowledge signal from the line selection circuit.

19. The circuit of claim 18, further comprising:
  a formatting circuit electrically coupled to the interface circuit and the address encoding circuit, configured to:
    receive the data signal from the interface circuit and the address signal from the address encoding circuit, and
    generate output data using the data signal and the address signal.

20. The circuit of claim 15, wherein the request-reading signal is generated by a pixel of the line if a temporal contrast determined by the pixel exceeds a threshold when the pixel receives the acknowledge signal.

21. The circuit of claim 20, wherein the request-reading signal comprises a first status indicative of a positive change of the temporal contrast and a second status indicative a negative change of the temporal contrast.

22. The circuit of claim 15, wherein the activation signal is generated by a photosensitive element of the active pixel in response to brightness of light impinging on the photosensitive element.

23. The circuit of claim 15, wherein the activation signal is generated by the active pixel when a temporal contrast determined by the active pixel exceeds a threshold.

24. A pixel circuit for use in an image sensor, comprising:
a comparator configured to generate a first request-reading signal when an input signal of the comparator matches a first condition, the input signal being generated from a photosensitive element in response to brightness of light impinging on the photosensitive element; and
a first latch circuit comprising a first set input, a first reset input, and a first output, wherein the first reset input and the first output are electrically coupled to an interface circuit, and the first set input is electrically coupled to the comparator and configured to:
receive the first request-reading signal by the first set input from the comparator,
output the first request-reading signal to the interface circuit,
lock the first set input to receive no signal, and
reset the first set input to receive a new signal in response to receiving an acknowledge signal from the interface circuit by the first reset input.

25. The pixel circuit of claim 24, wherein the comparator is further configured to generate a second request-reading signal when the input signal of the comparator matches a second condition.

26. The pixel circuit of claim 25, further comprising:
a second latch circuit comprising a second set input, a second reset input, and a second output, wherein the second reset input and the second output are electrically coupled to an interface circuit, and the second set input is electrically coupled to the comparator and configured to:
receive the second request-reading signal by the second set input from the comparator,
output the second request-reading signal to the interface circuit,
lock the second set input to receive no signal, and
reset the second set input to receive a new signal in response to receiving an acknowledge signal from the interface circuit by the second reset input.

27. The pixel circuit of claim 24, wherein the first condition comprises that a temporal contrast indicated by the input signal exceeds a first threshold.

28. The pixel circuit of claim 27, wherein the second condition comprises that the temporal contrast indicated by the input signal exceeds a second threshold.

29. The circuit of claim 28, wherein the first request-reading signal represents a positive change of the temporal contrast and the second request-reading signal represents a negative change of the temporal contrast.

* * * * *